(12) United States Patent
Baumann

(10) Patent No.: US 9,605,787 B2
(45) Date of Patent: Mar. 28, 2017

(54) PUMP RISER

(71) Applicant: Timothy Lee Baumann, Redmond, WA (US)

(72) Inventor: Timothy Lee Baumann, Redmond, WA (US)

( * ) Notice: Subject to any disclaimer, the term of this patent is extended or adjusted under 35 U.S.C. 154(b) by 0 days.

(21) Appl. No.: 14/619,707

(22) Filed: Feb. 11, 2015

(65) Prior Publication Data

US 2016/0230378 A1 Aug. 11, 2016

(51) Int. Cl.
*A47B 91/00* (2006.01)
*F16L 55/07* (2006.01)
*E03F 5/22* (2006.01)

(52) U.S. Cl.
CPC ............... *F16L 55/07* (2013.01); *E03F 5/22* (2013.01)

(58) Field of Classification Search
CPC ......... E03F 11/00; E03F 2201/00; E03F 3/04; F16L 55/07
USPC ........... 248/154, 157, 188.8, 346.01, 346.03, 248/346.3, 346.11; 52/20, 79.1, 136, 677, 52/685, 686, 687; 126/363; 137/312
See application file for complete search history.

(56) References Cited

U.S. PATENT DOCUMENTS

| | | | |
|---|---|---|---|
| 577,829 A * | 2/1897 | Brown ................... | A47J 43/22 126/30 |
| 1,725,568 A | 8/1929 | Cowle | |
| 1,767,535 A | 6/1930 | Lannert et al. | |
| 2,199,481 A * | 5/1940 | Chappell ................ | B65D 90/14 122/13.01 |
| 3,311,333 A * | 3/1967 | Galloway .............. | E04H 12/187 248/346.01 |
| 3,397,647 A | 8/1968 | Daniel | |
| 3,788,581 A | 1/1974 | Rutzick | |
| 3,830,032 A * | 8/1974 | Robb ...................... | E04C 5/206 52/687 |
| 4,060,954 A * | 12/1977 | Liuzza ..................... | E04C 5/20 52/169.1 |
| 4,201,597 A | 5/1980 | Armstrong et al. | |
| 4,243,197 A | 1/1981 | Wright | |
| 4,687,175 A | 8/1987 | Szendroi et al. | |
| 5,192,047 A | 3/1993 | Lisi et al. | |
| 5,333,825 A | 8/1994 | Christensen | |
| 5,464,188 A | 11/1995 | Priebe et al. | |
| 6,029,940 A | 2/2000 | Klein | |
| 6,863,250 B2 * | 3/2005 | Nauseda ............ | B01D 46/0005 248/150 |
| 7,063,301 B2 | 6/2006 | Schauer | |
| 7,810,782 B1 | 10/2010 | Driscoll | |
| 7,828,261 B2 | 11/2010 | Greer | |
| 7,891,635 B2 | 2/2011 | Rowland | |
| 2003/0197108 A1 * | 10/2003 | Domizio ................. | E04C 5/203 248/519 |
| 2006/0054769 A1 * | 3/2006 | Bewsky ............... | B43M 99/008 248/346.03 |

(Continued)

*Primary Examiner* — Gwendolyn Baxter
(74) *Attorney, Agent, or Firm* — Glenn Rickards

(57) ABSTRACT

A pump riser provided with recesses positioned and configured to receive and frictionally engage the legs of a septic system pump. The riser may support the pump above a support surface such as the bottom of the tank of a septic system. The riser body may include legs for supporting the riser body. The lower surface of a pump body may be supported above the upper surface of the riser body as the result of engagement between legs of a pump and the recesses.

11 Claims, 6 Drawing Sheets

(56) References Cited

U.S. PATENT DOCUMENTS

2008/0028718 A1* 2/2008 Erickson ............... E04C 5/206
52/687

* cited by examiner

PUMP RISER

TECHNICAL FIELD

The present method and apparatus relate to the field of supports for pumps.

BACKGROUND

One method of treating waste water is by use of a septic system. The prior art septic system shown in FIG. 1 may include a tank 10 that may comprise a single chamber 11. The tank may be capped with a lid 12 that has at least one access port 13 formed in it. The access port or ports 13 may be located proximate to an end of the lid 12 or may be centered in the lid 12 as desired. In FIG. 1, the access port 13 is shown as located adjacent one end of the lid 12. The tank 10 may be buried in the ground 14.

Access to the septic tank 10 may be available through a septic tank cover 16 which may allow access to the septic tank through a conduit or septic tank riser 17 that may be mated to the access port 13 in the lid 12 of the septic tank 10.

Two kinds of septic systems are currently in use: in one, the effluent flows out of the tank 10 under the influence of gravity. Alternatively, as shown in FIG. 1, an electric pump 18 is used to pump the effluent up the discharge pipe 19 and out into the drain field (not shown).

As building codes and the like may require that the pump 18 be elevated above the bottom of the tank 10, the current practice is to position a concrete paver or block 21 having a thickness, in some cases, of 4 inches (10 cm) or greater on the bottom of the tank 10, and position the pump 18 on top of the block 21. Unfortunately, the the block 21 is frequently mispositioned in the tank 10, and correcting the positioning of the block 21 from the surface through the septic tank riser 17 can be difficult or impossible. If one or more of the legs of the pump are not seated on the paver or block 21, the torque of the pump 18 starting up and shutting down may apply a tortional force to the discharge pipe 19 that may ultimately lead to its structural failure.

In addition, particulate matter may settle in the tank to form a layer of sludge 22, the upper surface of which slopes generally up and away from the location of the pump 18. When excessive sludge has accumulated, it may be necessary to pump the tank 10 out.

SUMMARY

A pump riser may be used to elevate a pump 18 above the bottom of a septic tank 10 or other support surface. Such a riser may frictionally engage the legs of a pump 18 to facilitate installation and removal. Legs of varying lengths may be provided or fabricated for the pump riser to adjust the height of the pump 18 above the support surface.

DETAILED DESCRIPTION

Figure 1:
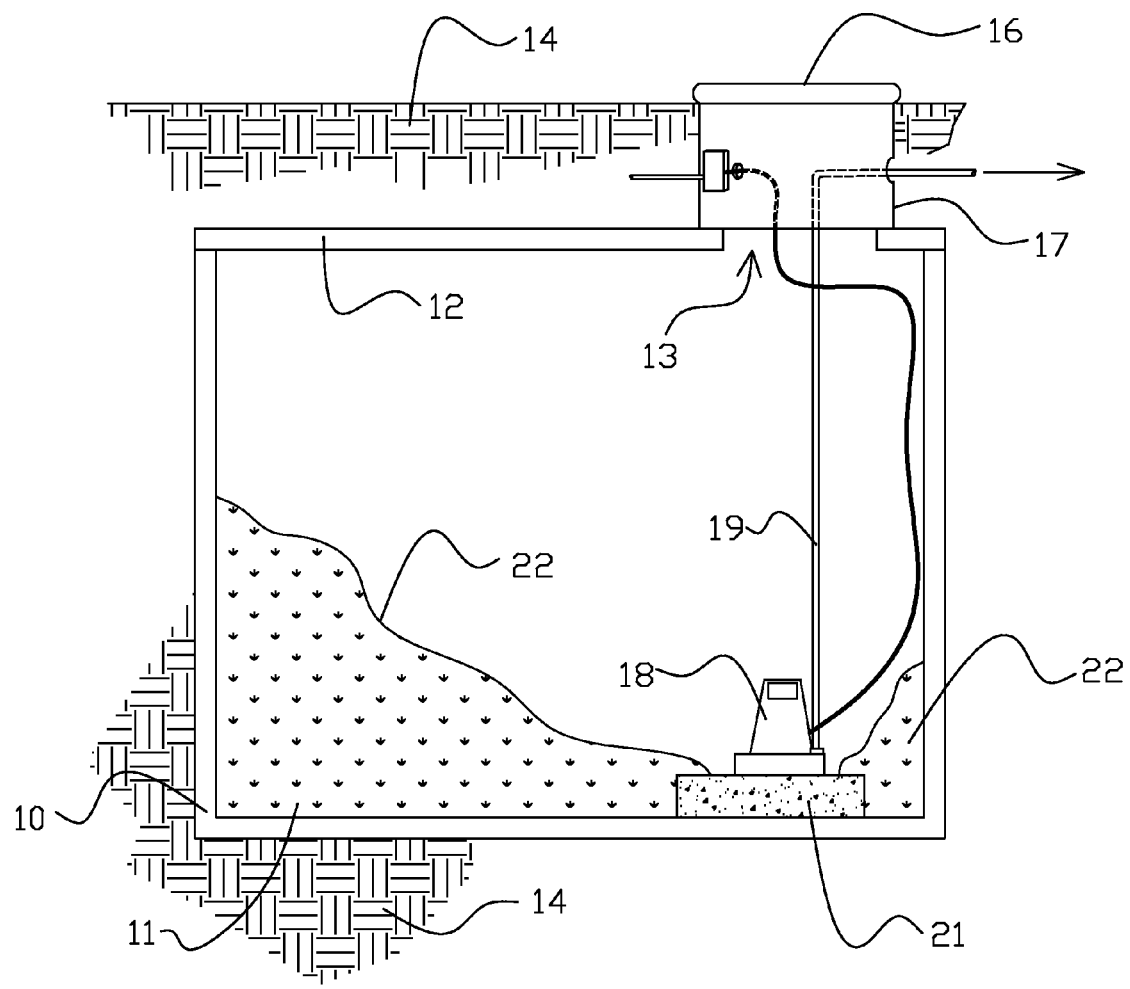
FIG. 1 is a sectional schematic view of a prior art septic tank system buried in the ground.
Figure 2:
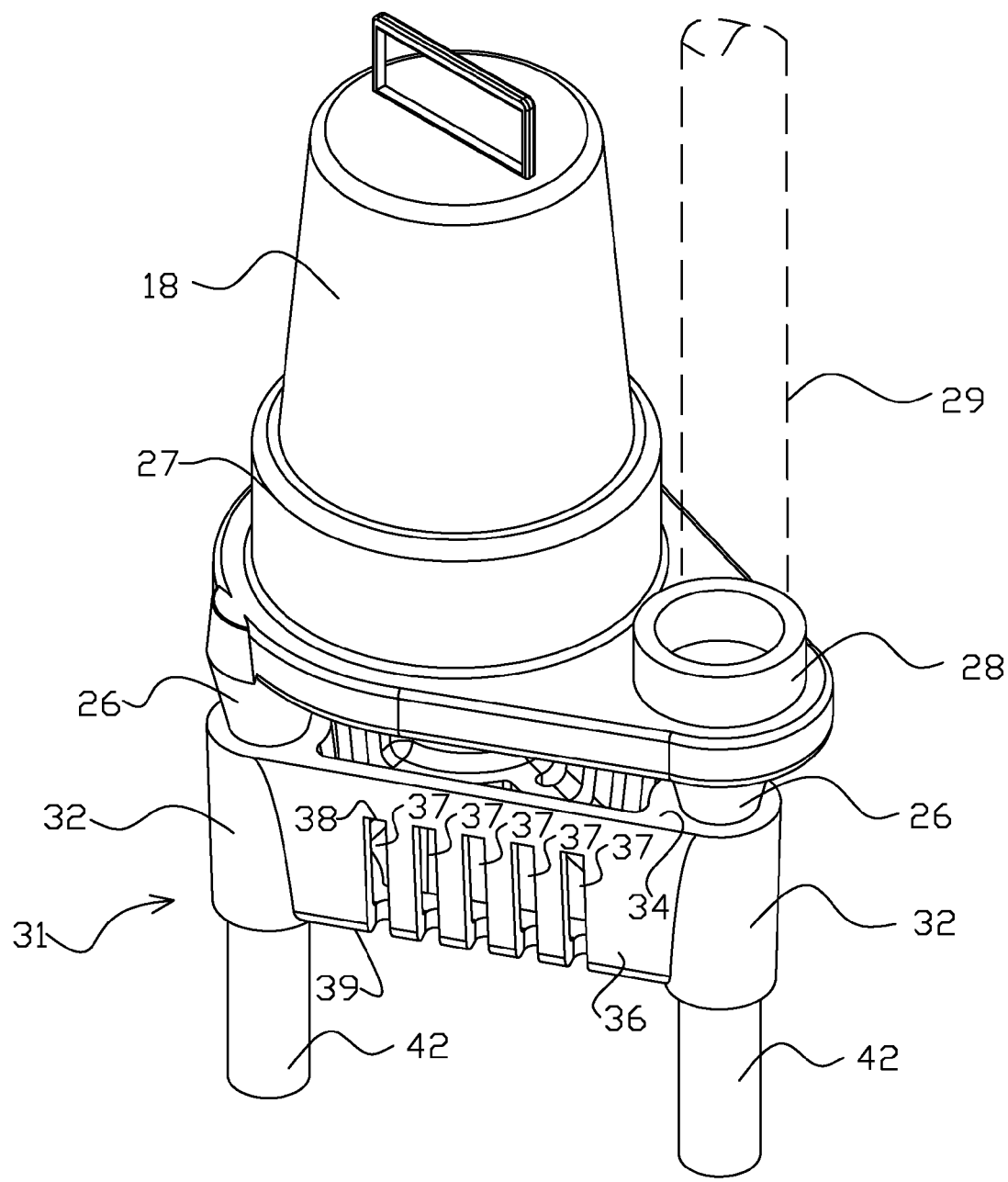
FIG. 2 is an isometric view of a pump mounted on a pump riser, with an outlet pipe shown in phantom.

As shown in FIG. 2 many pumps 18 useable in septic systems may be formed with three generally-frustoconical legs 26 disposed about, and depending from, the housing 27 of the pump 18. In one embodiment, the pump 18 may also include an inlet (not shown) at the bottom of the pump housing 27 through which effluent may be drawn, and an outlet 28 at one side of the pump that may be attached to an outlet pipe 29 (shown in phantom) such as the discharge pipe 19 shown in FIG. 1.

Figure 3:
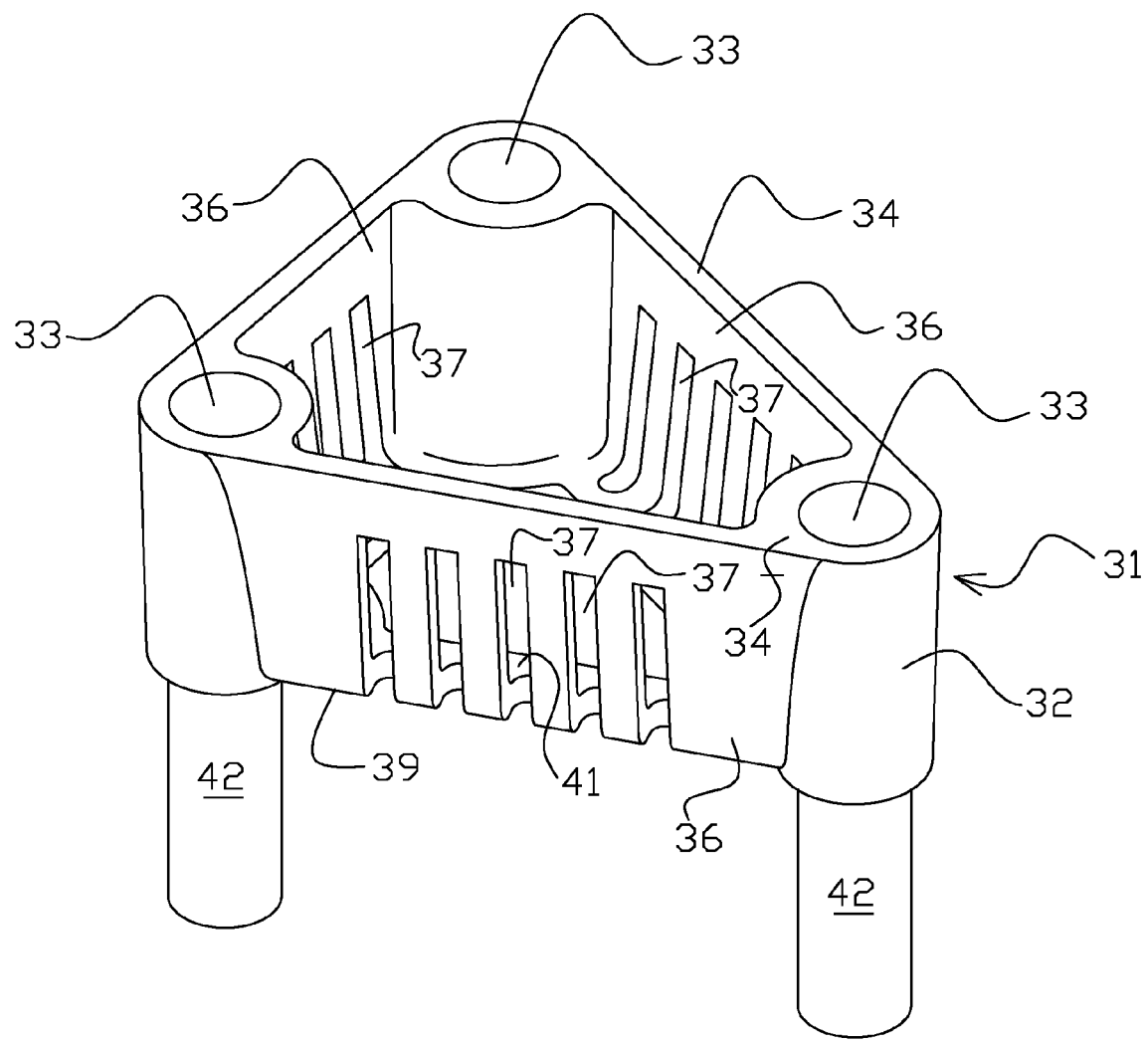
FIG. 3 is an isometric view of a pump riser.

In one embodiment, a pump 18 may be mounted on a pump riser 31 to support the inlet of the pump 18 above the bottom of a septic tank 10, or paver or block 21. The riser 31 may be made of any of a variety of materials, including polymeric materials such as PVC (polyvinylchloride) or ABS (acrylonitrile-butadiene-styrene) plastics. Referring to FIGS. 2 and 3, a pump riser 31 may comprise a body 32. Recesses 33, such as the cylindrical recesses 33 in the upper surface 34 of the pump riser 31, may be formed in the upper surface 34 of the body 32 of the riser 31 and may be spaced so that they are coaxial with the legs 26 of a pump 18. The dimensions of the cylindrical recesses 33 may be chosen such that the legs 26 of the pump 18 are constrained from extending completely down into the recesses 33, and so that the legs 26 of the pump 18 frictionally engage a wall or walls of the recess 33. In one embodiment, the legs 26 of the pump may be frustoconical and the recesses 33 may be cylindrical. Other configurations of leg 26 and recess 33 shape and size may be chosen in other embodiments. Fasteners, clamps or the like might also be used to secure the pump 18 to the body 32 of the pump riser 31, but this would add to the complexity of the riser 31. The diameter of the recesses 33 may be such that the outer surfaces of the legs 26 engage the inner surface of the recesses 33 after a certain percentage, which may be 50%, of the length of each of the legs 26 has entered the recess 33. In such an embodiment, the lower surface of the pump 18 may be supported above the level of the upper surface 34 of the pump riser 31, providing a gap through which effluent may flow toward the inlet of the pump 18.

In one embodiment, the engagement of the outer surface of the frustoconical legs 26 and the inner surface of the recesses 33 may be pushed into contact sufficient that the pump 18 and the pump riser 31 have a sufficient frictional engagement that lifting the pump 18 results in the riser 31 being lifted along with it.

Referring to FIGS. 2-6, in an embodiment intended for use with a pump 18 that has three frustoconical legs, a pump riser 31 may be generally triangular in shape when viewed from above. Each of the sides 36 of the riser 31 may be generally planar and of equal height along its length. In one embodiment, a series of vents 37 may be provided. These vents 37 may be vertically oriented and spaced apart from one another along the length of the sides 37. The upper ends 38 of the vents 37 vents 36 may be located at a position below the upper surface 34 of the pump riser 31, and may extend downward toward the lower edge 39 of the sides 36. The riser 31 may be provided with a shelf 41 that extends horizontally inward of the body 32 of the riser 31 at its lower edge 39. In such case, the vents 37 may extend around the lower edge 39 of the riser 31 and extend across a portion of the shelf 41.

Referring to FIGS. 2-6, in an embodiment intended for use with a pump 18 that has three frustoconical legs, a pump riser 31 may be generally triangular in shape when viewed from above. Each of the sides 36 of the riser 31 may be generally planar and of equal height along its length. In one embodiment, a series of vents 37 may be provided. These vents 37 may be vertically oriented and spaced apart from one another along the length of the sides 37. The upper ends 38 of the vents 36 may be located at a position below the upper surface 34 of the pump riser 31, and may extend downward toward the lower edge 39 of the sides 36. The riser 31 may be provided with a shelf 41 that extends horizontally inward of the body 32 of the riser 31 at its lower edge 39. In such case, the vents 37 may extend around the lower edge 39 of the riser 31 and extend across a portion of the shelf 41.

The vents 37 may have a width selected to restrict the flow of larger particulates into the pump 18 while still allowing the flow of effluent through them. In one embodiment, the width of the vents 37 may be selected as ¼ inches (0.64 cm). This may be varied according to the size of the particles intended to be blocked by the vents 37. Such particles may comprise organic material such as clumps of tissue paper or inorganic material such as small pebbles. As is known in the art, such large particulates in effluent fed to a drain field may compromise the drain field. Such filtering may be particularly important as sludge builds up in a septic tank.

Figure 4:
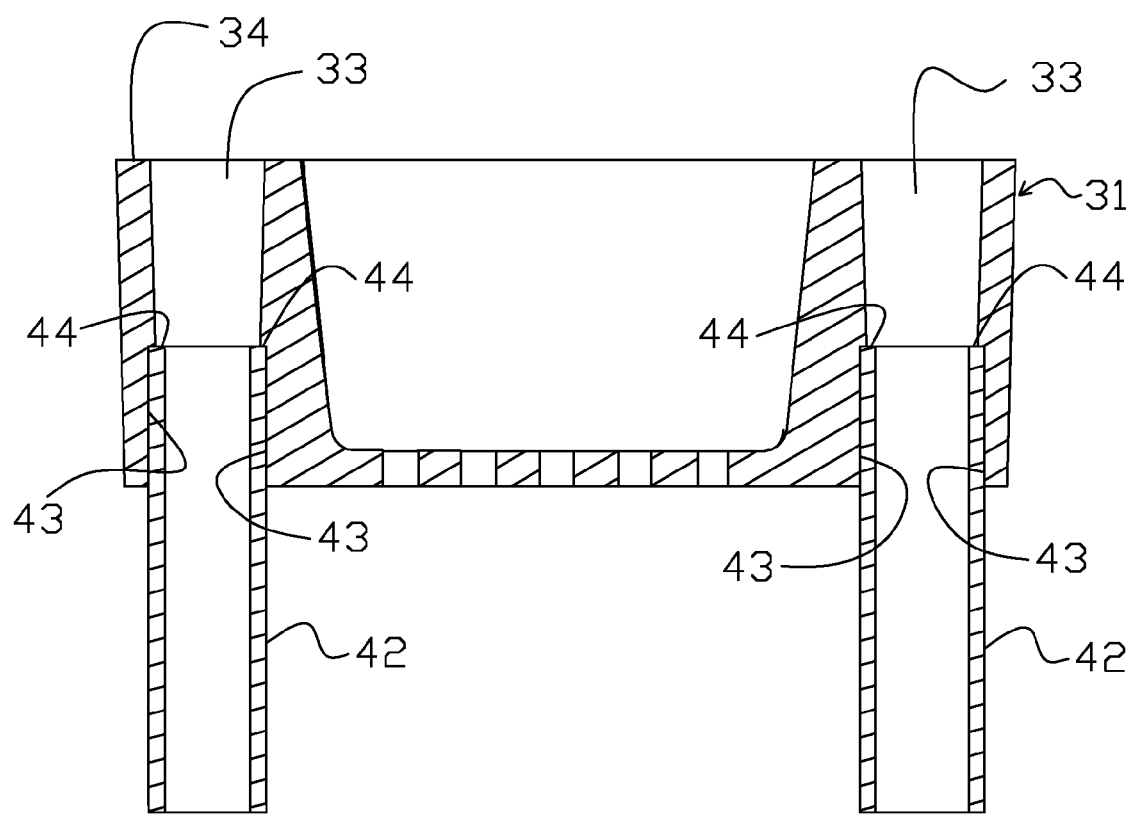
FIG. 4 is a sectional view of the pump riser of FIG. 3.
Figure 5:
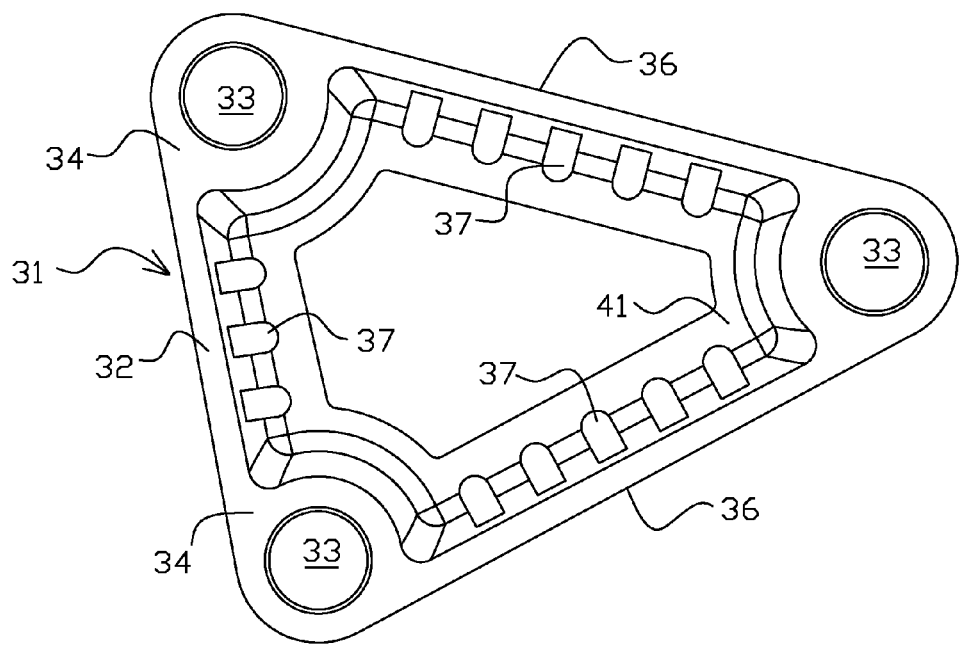
FIG. 5 is a top plan view of the pump riser of FIG. 3.
Figure 6:
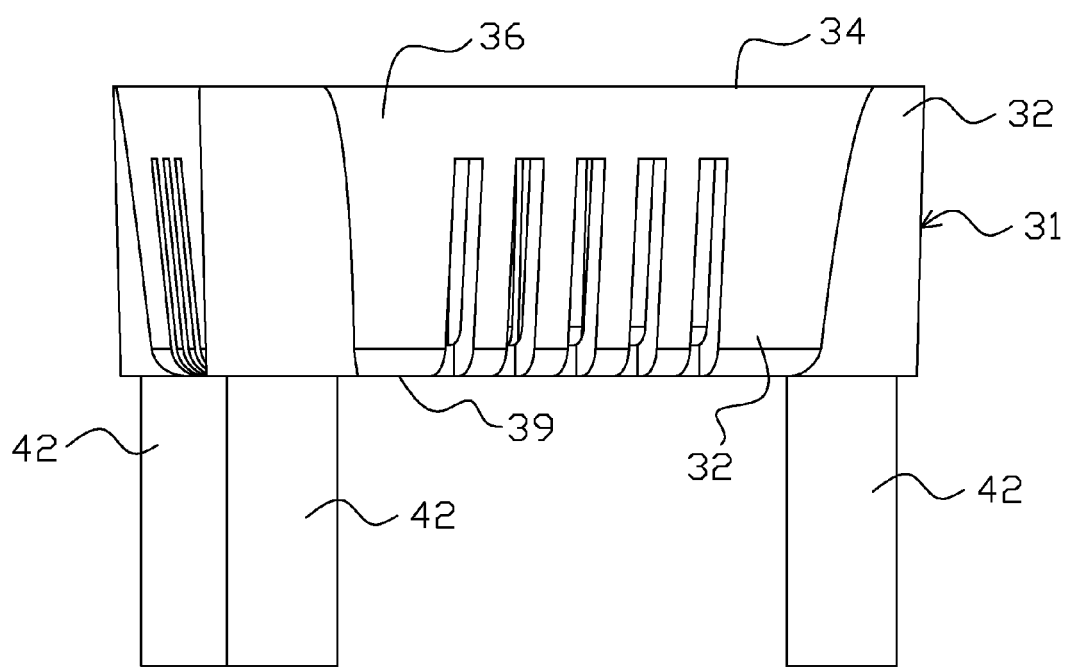
FIG. 6 is a side elevation of the pump riser of FIG. 3.

Referring particularly to FIGS. 2 and 4, in one embodiment the riser 31 may be provided with legs 42 extending downward below the lower edge 39 of the body 32 of the riser 31. These may support the body 32 of the riser 31 at a level above a support surface, such as the bottom of a septic tank 10 or paver or block 21 positioned at the bottom of a septic tank 10. In one embodiment, the legs 42 may be made of short sections of polymeric pipe, such as ABS or PVC pipe, and may fit snugly into cylindrical channels or bores 43 in the body 32 of the riser 31.

In another embodiment, as shown in FIG. 4, the diameter of the bore 43 may be chosen such that the legs 42 fit snugly in them. The bores 43 may extend upward into the body 32 of the riser 31. The bores 43 may be formed to be coaxial with cylindrical recesses 33 in the upper surface 34 of the body 32 of the riser 31. In such case, in one embodiment, the bores 43 may have a diameter greater than that of the recesses 33 and a shoulder 44 may thus be formed that may limit the depth to which the legs 42 may be inserted into the bore 43. In one embodiment, 1 inch PVC Schedule 40 pipe may be used for the legs 42. This material is easily cut with hand tools to a desired length, and is sufficiently strong and rigid for this purpose. The lengths of the legs 42 may be selected such that the pump 18 may be supported above a support surface such as the bottom of a septic tank 10. As PVC pipe is readily cut, the length of the legs 42 may be selected and the legs 42 may be cut in the field. Of course, the bores 43 and recesses 33 do not have to be coaxial, and their shapes need not be cylindrical.

As mentioned above, the dimensions of the bores 43 and legs 42 may be chosen such that they form a frictional engagement when assembled together. This frictional engagement may be sufficiently strong so that an assembly of pump 18 and riser 31 may be lowered into a septic tank 10 without the pump 18 disengaging from the body 32 of the riser 31 and without the legs 42 disengaging from the bores 43 in the body 32 of the riser 31. Of course, the legs 42 could be secured by adhesive in the body 32 of the riser 31 if desired.

The body 32 of the riser 31 may be made by any of a variety of known techniques, such as by machining, fastening together of various components using fasteners or adhesives, and the like, but molding provides an inexpensive and rapid method for such manufacture.

Although the present invention has been described in considerable detail with reference to various embodiments, other embodiments are possible. Therefore, the spirit or scope of the appended claims should not be limited to the description of the embodiments contained herein.

I claim:

1. A pump riser for use with a pump in a septic system tank, the pump having a plurality of legs extending downward therefrom, comprising:
   a riser body, the body having recesses formed in its upper surface, the recesses being dimensioned and positioned to receive the legs of a pump such that at least a portion of the legs are insertable into the recesses; and
   a plurality of cylindrical bores formed in a lower surface of the riser body, the bores being sized and positioned to receive legs to support the riser body above a support surface wherein the riser body includes a plurality of sides, the sides further forming a plurality of vents, the width of the vents being chosen to limit the size of particles that can pass therethrough.

2. The pump riser of claim 1 further comprising legs insertable into the bores formed in the lower surface of the riser body to support the riser body a distance above the support surface.

3. The pump riser of claim 2 wherein the dimensions of the bores formed in the lower surface of the riser body and of the legs are chosen such that the legs frictionally engage the walls of the bores when inserted therein to the extent that they remain in frictional engagement with the riser body when the legs are not supported by a support surface.

4. The pump riser of claim 3 wherein each of the bores formed in the lower surface of the riser body include a stop that limits the depth to which the legs may be inserted into the riser body.

5. The pump riser of claim 1 wherein the recesses in the upper surface of the riser are dimensioned such that frustoconical legs of a pump are insertable into the recesses along only a portion of their length such that the lower surface of a pump is maintained at a distance above the upper surface of the pump riser.

6. A pump riser for use with a pump in a septic system tank, the pump having a plurality of legs extending downward therefrom, comprising:
   a riser body, the body having recesses formed in its upper surface, the recesses being dimensioned and positioned to receive the legs of a pump such that at least a portion of the legs are insertable into the recesses; and
   a plurality of cylindrical bores formed in a lower surface of the riser body, the bores being sized and positioned to receive legs to support the riser body above a support surface,
   wherein the recesses in the upper surface of the riser are cylindrical and wherein the recesses and the cylindrical bores are coaxial and communicate with one another, the diameter of the recesses being less than that of the cylindrical bores such that a shoulder is formed between the recesses and the cylindrical bore, such shoulder forming a stop.

7. A pump riser comprising:
   a riser body, the body having an upper surface and a lower surface with side walls extending between them, the body forming a plurality of recesses extending downward into the body, the recesses being configured and positioned to receive and frictionally engage the legs of a pump wherein the sides of the riser body further comprise a plurality of vents sized to allow a flow of fluids therethrough while restricting particulate matter having a size greater than the width of the vents from passing therethrough.

8. The pump riser of claim 7 further comprising a plurality of legs descending below the lower surface of the riser body for supporting the riser body at a distance above the support surface.

9. The pump riser of claim 7 wherein the riser body includes a plurality of channels extending upward through the lower surface of the riser body and wherein the legs of the pump riser are insertable into the channels.

10. A pump riser comprising:
a riser body, the body having an upper surface and a lower surface with side walls extending between them, the body forming a plurality of recesses extending downward into the body, the recesses being configured and positioned to receive and frictionally engage the legs of a pump, wherein the frictional engagement between the legs of a pump and the recesses is sufficient to maintain the riser in engagement with the pump when the pump and riser are lowered into a tank of a septic system.

11. The pump riser of claim 10 wherein the upper surface of the riser body forms an aperture through which fluids may flow to reach the inlet of the pump supported by the riser body.

* * * * *